United States Patent

[11] 3,625,242

[72] Inventor Fritz Ostwald
 Buchschlag, Germany
[21] Appl. No. 3,215
[22] Filed Jan. 15, 1970
[45] Patented Dec. 7, 1971
[73] Assignee International Telephone and Telegraph Corporation
 New York, N.Y.
[32] Priority Jan. 17, 1969
[33] Germany
[31] P 19 02 217.4

[54] PRESSURE ACCUMULATOR
 1 Claim, 1 Drawing Fig.
[52] U.S. Cl. .................................................... 138/30
[51] Int. Cl. ................................................ F16l 55/04
[50] Field of Search ........................................... 138/26, 30

[56] References Cited
 UNITED STATES PATENTS
2,878,835 3/1959 Peterson ..................... 138/30
2,949,932 8/1960 Hewitt ........................ 138/30 X
3,251,380 5/1966 Mercier ....................... 138/30
3,331,399 7/1967 VonForell ..................... 138/30

FOREIGN PATENTS
1,282,222 12/1961 France ........................ 138/30

Primary Examiner—Laverne D. Geiger
Assistant Examiner—Edward J. Earls
Attorneys—C. Cornell Remsen, Jr., Walter J. Baum and Paul W. Hemminger ABSTRACT: In a pressure accumulator having a cylindrical housing, a coaxial perforated pipe supported within the housing through which pressure medium flows and an elastic tubular partition dividing the space between the housing and the pipe into an outer annular gas chamber and an inner chamber. The ends of the cylindrical housing have recessed sections and tapered end rings which press the elastic tube against the recessed sections to seal the accumulator. The rings also support the perforated tube and have means for fitting the accumulator in a pressure line.

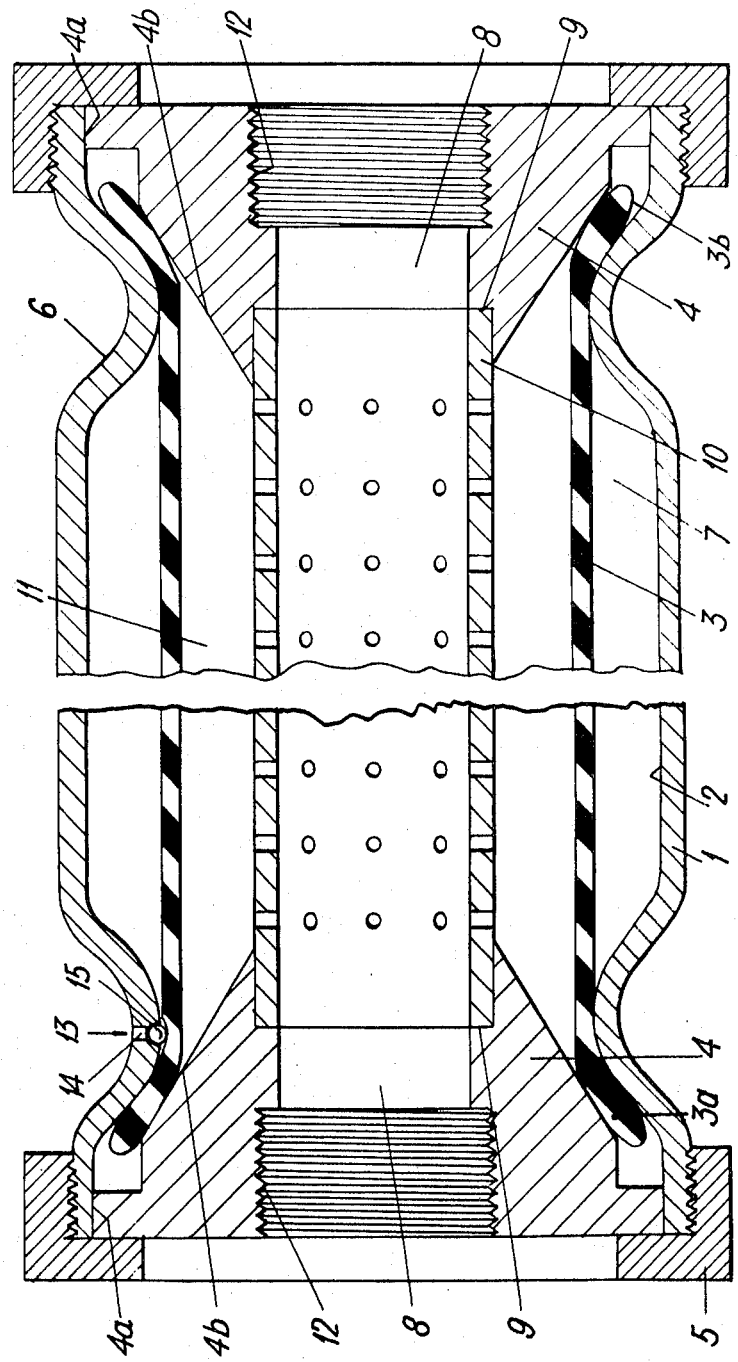

PRESSURE ACCUMULATOR

BACKGROUND OF THE INVENTION

1. Field of the Invention

This invention relates to pressure accumulators and particularly to pressure accumulators having a rigid housing and an elastic partition dividing the space enclosed by the housing into two chambers, one of the chambers being filled with gas.

Pressure accumulators of this type may be used in hydraulic brake boosters and in hydraulic or pneumatic systems having large variations in demand for pressure medium during operation.

2. Description of Prior Art

A cylindrical pressure accumulator with an elastic partition is shown in the published German Pat. application No. 1,232,418. In this application a partition divides an accumulator into a pressure medium chamber and a gas chamber, the partition being mounted on the accumulator housing and on a closing body which slides with little friction on the free end of a guide tube projecting into the accumulator to close the muzzle. The guide tube serves to support the partition as well as to supply pressure medium to the accumulator. The elastic partition of this prior art pressure accumulator is arranged coaxially with the accumulator housing and is expanded by pressure surges in a radial and axial direction. However, a disadvantage of this known pressure accumulator is that it is quite intricate in construction and is provided with only one connection, thus it cannot be placed in the pressure line and additional space is needed for it. The pressure developed in such pressure accumulator may reach 100 times atmospheric pressure which results in forces in excess of 10 tons pressing on the accumulator walls. In order to withstand these forces, the walls of the accumulator must be very thick, thus increasing the weight. In addition, reliable sealing becomes quite difficult and expensive with this construction.

A pulse dampener and hydraulic shock absorber of an axial flow-through design with a cylindrical outer casing and an elastomeric tubular partition forming two chambers, the outer of which is filled with an inert gas, is also known but a disadvantage of this device is that several sealing rings are necessary in addition to the elastomeric tube and this increases the likelihood of a seal failure during the service life of the device.

SUMMARY OF THE INVENTION

An object of the present invention is to provide an in-line pressure accumulator of the type having an outer cylindrical casing and an elastomeric tubular sealing partition forming a compressible gas chamber with the casing wall which is simple and inexpensive to construct and which requires no additional seals.

This object is achieved in a cylindrical pressure accumulator having an outer rigid cylindrical housing, an inner rigid cylindrical supporting pipe and an elastomeric tubular partition between them forming a gas chamber by means of recessed sections on the ends of the casing and tapered end rings which support the inner pipe and which press the elastomeric tube against the inner wall of the casing to seal the unit. Caps screwed onto the outer casing force the end rings inward. A bore in the outer casing at the middle of one of the recessed sections is sealed by a rubber ball held against the cylinder by the elastomeric partition to provide a charging valve for the gas chamber.

DESCRIPTION OF THE PREFERRED EMBODIMENT

The pressure accumulator shown in section in the drawing essentially comprises a cylindrical housing 1 which has a considerable length compared with the diameter, the ratio being preferably from 10:1 up to 100:1.

Coaxially within the housing 1 an elastic tube 3 of about the same length as the housing is held at its ends 3a, 3b by rings 4 and screwcaps 5 which hold the rings in position. The housing 1 has reduced diameter sections 6 near the ends and the elastic tube is pressed against these recesses and thus prestressed. The rings 4 each consist of a cylindrical part 4a and of a conical part 4b tapered toward the center of the accumulator. The cylindrical part 4a corresponds to the inner diameter of the housing 1, while the inclination of the conical part 4b essentially corresponds to the inclination of the recess 6.

In this way an annular pressure chamber 7 is formed between the inner wall 2 of the housing 1 and the elastic tube 3. This chamber filled with gas acts as pressure cushion against the pressure fluid within the elastic tube 3.

When the elastic tube 3 is assembled, the cylindrical part 4a of the rings 4 slides along the inner wall 2 of the housing 1 towards the accumulator center under the influence of the tightening of the screwcap 5. The conical parts 4b of the rings 4 slide into the ends 3a, 3b of the elastic tube, widens them outwardly and then presses the outside of the widened ends 3a, 3b against the recesses 6 whose inclinations corresponds to that of the conical parts 4b.

Each ring 4 provides an axial bore 8 which has a shoulder 9 towards the center of the accumulator. On these shoulders a preferably sintered, perforated pipe element 10 is supported coaxially with respect to the housing 1 and the elastic tube. This perforated pipe element 10 determines the actual passage cross section of the pressure accumulator. In this way the pressure medium flowing in an axial direction through the accumulator can pass through the perforations into chamber 11 formed by the pipe element 10 and the elastic tube 3 so that upon increased pressure the elastic tube 3 can expand outwardly and if extremely stressed lie against the inner wall of the housing 1. The perforation size is selected so that a damping of pressure impulses results. At the ends remote from the shoulder 9 of the axial bore 8 the rings 4 provide threaded sections 12 for the connection of the accumulator to the main pressure medium line.

In order to increase the working capacity the annular chamber 7 is filled with a compressible medium, preferably gas, through the valve 13. Using the elastic tube 3 as return spring for the valve body 15 which is preferably a rubber ball, the valve 13 is arranged in the bottom of one of the recesses 6. The funnel-shaped bore 14 in the housing serves as valve seat.

It will be appreciated that the invention illustrated and described herein may be modified by those skilled in the art without deviating from the spirit and scope of the invention as set forth in the following claims.

I claim as my invention:

1. A pressure accumulator for connection to a main pressure medium line comprising:
   a rigid, cylindrical housing having
      two end portions having a given outer diameter and a given wall thickness,
      a central portion having said given outer diameter and said given wall thickness, and
      two arcuate portions having said given wall thickness and an outer diameter less than said given diameter, each of said arcuate portions interconnecting the associated one of said end portions and said central portion,
   each of said end portions having at least a portion of their outer surface threaded,
   each of said arcuate portions including a first portion thereof adjacent its associated one of said end portions sloping from said associated one of said end portions toward said central portion and the longitudinal axis of said housing;
   a perforated pipe disposed coaxially within said housing through which said pressure medium flows;
   an elastic tubular partition disposed coaxially within said housing dividing the space between said housing and said pipe into an outer annular gas chamber and an inner chamber;
   a pair of end rings one for each end of said housing, each of said rings including
      an annular portion slidably engaging the inner surface of its associated one of said end portions, an axial bore having a shoulder for supporting and retaining said pipe in position and a threaded inner surface for threading into said main line, and an outer surface tapering from said annular portion toward said central portion and the longitudinal axis of said housing substantially parallel to the inner surface of said first portion of the associated one of said arcuate portions;

a pair of caps one for each end of said housing, each of said caps including an annular ring transverse of the longitudinal axis of said housing engaging the associated one of said rings and a threaded longitudinal portion threaded onto the threaded outer surface of its associated one of said end portions to urge said tapered outer surface of the associated one of said end rings toward the inner surface of said first portion of the associated end of said arcuate portions to clamp the associated end of said elastic partition therebetween; and a value for filling said gas chamber including a funnel-shaped bore in the apex of one of said arcuate portions, and a ball composed of an elastic material held in position against the opening of said bore by said elastic partition.

* * * * *